(12) United States Patent
Tanpairoj et al.

(10) Patent No.: US 12,175,111 B2
(45) Date of Patent: Dec. 24, 2024

(54) DATA MIGRATION TECHNIQUES

(71) Applicant: Micron Technology, Inc., Boise, ID (US)

(72) Inventors: Kulachet Tanpairoj, San Mateo, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 121 days.

(21) Appl. No.: 17/647,943

(22) Filed: Jan. 13, 2022

(65) Prior Publication Data

US 2022/0229574 A1 Jul. 21, 2022

Related U.S. Application Data

(60) Provisional application No. 63/139,418, filed on Jan. 20, 2021.

(51) Int. Cl.
*G06F 3/06* (2006.01)
(52) U.S. Cl.
CPC .......... *G06F 3/0647* (2013.01); *G06F 3/0614* (2013.01); *G06F 3/0635* (2013.01); *G06F 3/0659* (2013.01); *G06F 3/0679* (2013.01)

(58) Field of Classification Search
CPC .... G06F 3/0647; G06F 3/0614; G06F 3/0635; G06F 3/0659; G06F 3/0679; G06F 3/0625; G06F 3/0661; G06F 3/0688; G06F 3/0643
USPC .......................................................... 711/154
See application file for complete search history.

(56) References Cited

U.S. PATENT DOCUMENTS

| | | | | |
|---|---|---|---|---|
| 2010/0138595 | A1* | 6/2010 | Yoon | G06F 12/0246 711/E12.001 |
| 2017/0337969 | A1* | 11/2017 | Shikata | G11C 11/5628 |
| 2022/0100406 | A1* | 3/2022 | Zhou | G06F 3/0616 |
| 2022/0164123 | A1* | 5/2022 | Kim | G06F 3/0659 |

* cited by examiner

*Primary Examiner* — Charles Rones
*Assistant Examiner* — Jonah C Krieger
(74) *Attorney, Agent, or Firm* — Holland & Hart LLP

(57) ABSTRACT

Methods, systems, and devices for data migration techniques are described. The memory system may receive a command associated with a write operation from a host device. The memory system may determine whether to use a data migration technique for writing data to the memory device based on receiving the command. In some cases, the memory system may select a tri-level write format instead of a quad-level write format for writing the data and write the data using the tri-level write format. The memory system may convert the data from the tri-level write format to the quad-level write format based on writing the data using the tri-level write format.

25 Claims, 5 Drawing Sheets

DATA MIGRATION TECHNIQUES

CROSS REFERENCE

The present application for patent claims the benefit of U.S. Provisional Patent Application No. 63/139,418 by TANPAIROJ et al., entitled "DATA MIGRATION TECHNIQUES," filed Jan. 20, 2021, assigned to the assignee hereof, and expressly incorporated by reference in its entirety herein.

FIELD OF TECHNOLOGY

The following relates generally to one or more systems for memory and more specifically to data migration techniques.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
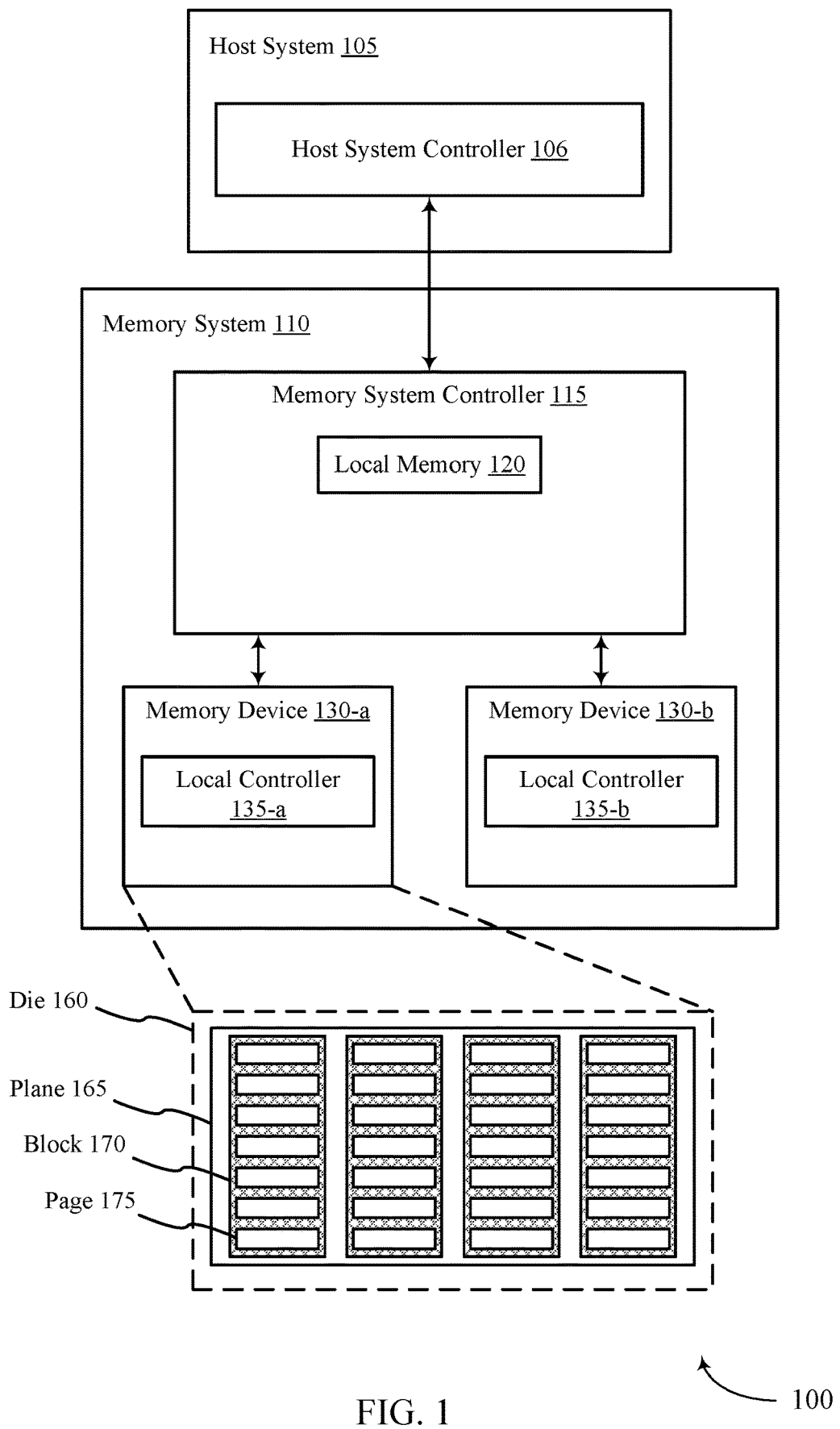
FIG. 1 illustrates an example of a system that supports data migration techniques in accordance with examples as disclosed herein.

Some memory systems may be used for or may need to perform a relatively large data transfer from a first memory system (that may include a first memory device) to a second memory system (that may include a second memory device). For example, the first memory system (that may include the first memory device) may include existing data that may need to be transferred to the second memory system (that may include the second memory device). The relatively large data transfer may be an example of an initial data transfer, such as transferring existing data from a first device (e.g., an older electronic device like a smartphone that may include a first memory system) to a second device (e.g., a newer electronic device likes a smartphone that may include a second memory system). In some examples, an amount of space available in a cache of the second memory system may be less than an amount (e.g., size) of the data to be transferred. In such cases, using the cache during the data transfer may be unavailable or ineffective due to the cache not being able to store all the data to be transferred. In some examples, a direct write to transfer data using some more complicated data migration techniques, such as a quad-level cell (QLC) data migration technique, may be slower than other less complicated data migration techniques, such as a tri-level cell (TLC) data migration technique, which may result in the memory device experiencing longer programming times, longer transfer times, and longer processing times, among other disadvantages, while using more complicated data migration techniques. Additionally, such techniques may result in the memory system experiencing a performance loss when performing memory device operations, such as performing a relatively large data transfer from the first memory system to the second memory system, which may increase the latency for other operations. By using a more complicated data migration technique, such as the QLC data migration technique, the memory system may also use an increased amount of power, thereby decreasing the overall performance of the memory system. Alternative techniques to migrate data without compromising the memory device performance and avoiding some of the disadvantages that may be present using a more complicated data migration technique are described in the present disclosure.

Aspects of the present disclosure address the above and other deficiencies by having a memory system that performs an efficient and effective data migration technique. The memory system may receive a command, for example, a command associated with a write operation, from a host system. In some examples, the memory system may determine whether to use a data migration technique for writing data to the memory system, such as a memory device (e.g., the memory device included as part of the memory system). For example, the memory system may detect a data transfer request based on the command, and determine that the data transfer may be a one-time only data transfer from a first memory system to a second memory system based on a size of the data, a continuity of the data, space available to be written in the memory device, or a completion of a production operation, one or more other factors, or any combination thereof. In some examples, the second memory system may select a first write format, such as a tri level write format (e.g., a TLC write format) for writing the data and write the data to the second memory device of the second memory system using the tri-level write format. For example, the existing data (e.g., from the first memory device) may be moved to the second memory system (e.g., the second memory device of the second memory system) using the tri-level write format as a transitional format. The memory system may then migrate (e.g., convert) the data from one format to another, such as the tri-level write format to a quad-level write format (e.g., a QLC write format) after the data is written into the tri-level write format in the second memory system (e.g., the second memory device).

By using the data migration techniques described herein, the overall performance of the memory system may increase by improving the user experience for the second memory system (e.g., including the second memory device) and data transfer implementing solutions related to writing in different write formats. For example, the data migration technique may improve the memory system performance on the initial data transfer as well as the overall efficiency of the memory system without allocating a large, dedicated cache to support data migration. In such cases, the memory system may reduce latency between transmission of one or more commands and writing to one or more memory devices, may improve read, write, and erase speeds, and may improve processing times, among other advantages.

Features of the disclosure are initially described in the context of a system as described with reference to FIG. 1. Features of the disclosure are described in the context of flowcharts as described with reference to FIGS. 2-3. These and other features of the disclosure are further illustrated by and described with reference to an apparatus diagram and flowcharts that relate to data migration techniques as described with reference to FIGS. 4-5.

FIG. 1 illustrates an example of a system 100 that supports data migration techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 when read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

The system 100 may include any quantity of non-transitory computer readable media that support data migration techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Each memory cell of the NAND memory device 130 may be programmed to store one or more logic values representing one or more bits of information. In some cases, a single memory cell—such as an SLC memory cell—may be programmed to one of two supported states and thus may store one bit of information at a time (e.g., a logic 0 or a logic 1). In other cases, a single memory cell—such as an MLC, TLC, QLC, or other type of multiple-level memory cell—may be programmed to one of more than two supported states and thus may store more than one bit of information. In some examples, a single MLC memory cell may be programmed to one of four supported states and thus may store two bits of information at a time corresponding to one of four logic values (e.g., a logic 00, a logic 01, a logic 10, or a logic 11). In some examples, a single TLC memory cell may be programmed to one of eight supported states and thus may store three bits of information at a time corresponding to one of eight logic values (e.g., 000, 001, 010, 011, 100, 101, 110, or 111). In some examples, a single QLC memory cell may be programmed to one of sixteen supported states and thus may store four bits of information at a time corresponding to one of sixteen logic values (e.g., 0000, 0001, . . . 1111).

In some cases, a multiple-level memory cell (e.g., an MLC memory cell, a TLC memory cell, a QLC memory cell) may be physically different than an SLC cell. For example, a multiple-level memory cell may use a different cell geometry or may be fabricated using different materials. In some cases, a multiple-level memory cell may be physically the same or similar to an SLC cell, and other circuitry in a memory block (e.g., a controller, sense amplifiers, drivers) may be configured to operate (e.g., read and program) the memory cell as an SLC cell, or as an MLC cell, or as a TLC cell, or as a QLC, etc.

In some cases, a memory system 110 may utilize a memory system controller 115 to provide a managed memory system that may include, e.g., one or more memory arrays and related circuitry combined with a local (e.g., on-die or in-package) controller (e.g., local controller 135). An example of a managed memory system is a managed NAND (MNAND) system.

In some examples, the memory system 110 may receive a command, such as a write command, from the host system 105. The memory system 110 may determine whether to use a data migration technique for writing data to the memory device 130. In some cases, the memory system 110 may select a TLC write format for writing the data. For example, the memory system 110 may select the TLC write format instead of selecting the QLC write format. The memory system 110 may write the data to the memory device 130 using the TLC write format based on the selection. In some examples, the memory device 130 may be configured to write data in the TLC write format and the QLC write format. The memory device 130 may be an example of a wireless device such as a tablet, cellular phone, laptop computer, or other similar device or spatially distributed network of memory devices configured to receive signals and transfer data (e.g., a relatively large data chunk such as 64 gigabytes of data) from a first memory device (e.g., old device) to a second memory device (e.g., new device). The memory system 110 may migrate (e.g., convert) the data written in the TLC write format to the QLC write format after writing the data in the TLC write format.

The memory system 110 may determine whether to use the data migration technique (e.g., out of possible different options for data write format techniques) by determining whether a production operations is complete and/or determining whether an amount of space available to be written exceeds a threshold. In some examples, the memory system 110 may determine whether to use the data migration technique by determining whether the data is sequential data and/or determining whether a size of the data exceeds a threshold. In some cases, the memory system 110 may determine to use the data migration technique if the memory system 110 determines that the production operation is complete, that the amount of space available in the second memory system (e.g., second memory device) is equal to or above the threshold, that the data is sequential data, and/or that the size of the data exceeds the threshold.

Figure 2:
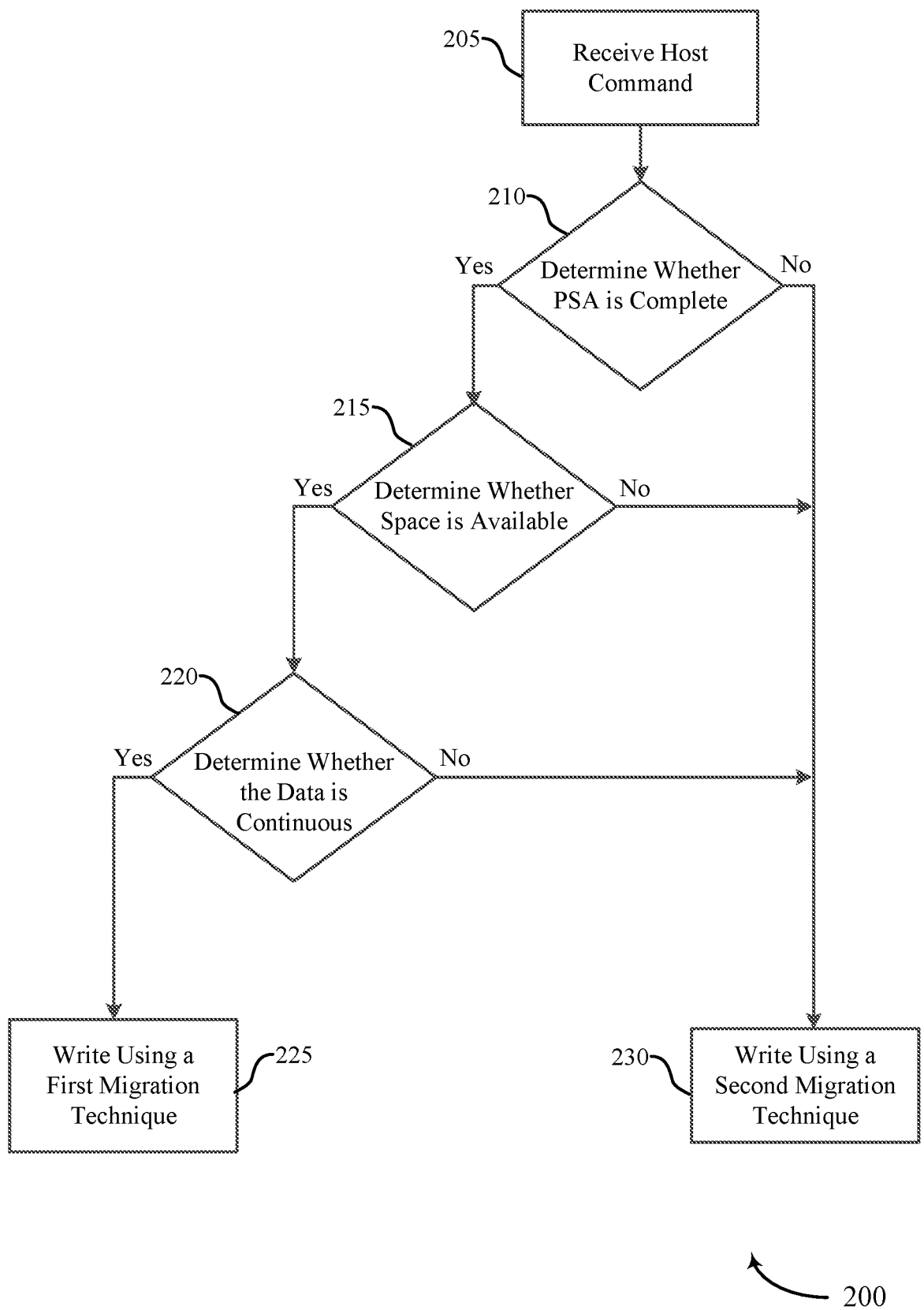
FIG. 2 illustrates a process that supports data migration techniques in accordance with examples as disclosed herein.

FIG. 2 illustrates a process 200 that supports data migration techniques in accordance with examples as disclosed herein. Aspects of the process 200 may be implemented by a controller, among other example components. Additionally or alternatively, aspects of the process 200 may be implemented as instructions stored in memory (e.g., firmware stored in a memory coupled with the memory system 110). For example, the instructions, when executed by a controller (e.g., the memory system controller 115), may cause the controller to perform the operations of the process 200.

In some cases, a user of a first memory system (or a memory device itself acting autonomously based on some program or instruction) may request to transfer data from the first memory system to a second memory system. The amount of data to transfer to the second memory system (e.g., to a second memory device), however, may exceed a threshold, thereby increasing the programming time and increasing the power consumption of the second memory system (e.g., second memory device), among other disadvantages. In other examples, a cache of the second memory system may be unable to store the transferred data due to a size limitation (e.g., the available space in the cache may be less than the amount of data to be transferred). In other examples, data may be able to be written directly to one memory device, such as a TLC main storage of the second memory device or a single main storage in TLC write format, and techniques may be desired to instead write the data to another memory device, such as a QLC main storage, or the same memory device but in QLC write format.

However, the process of writing to the QLC main storage or writing in QLC write format may perform write operations at increased durations (relative to writing in other non-QLC write formats) because the QLCs each includes four levels. In such cases, the placement of the electrons within the four levels may be performed with increased precision to obtain the four levels, thereby increasing the programming time (among other disadvantages) to ensure accurate placement and increased control.

Instead of writing directly to the QLC main storage or instead of writing directly using the QLC write format, the memory system may use a data migration technique (e.g., first migration technique) that writes the data using a tri-level (e.g., TLC) write format and converts the tri-level write format to a quad-level (e.g., QLC) write format after writing the data using the tri-level write format. The memory system may determine when to use this data migration technique, among others, as described in reference to process 200. The data migration technique may allow the memory system to detect a request for data migration and transfer a large amount of data from the first memory device to the second memory device.

At 205, a host command may be received. For example, the memory system (e.g., memory system 110) may receive, from a host system (e.g., host system 105) and/or another memory system, a command associated with a write operation. In such cases, the memory system 110 may determine whether to use a data migration technique for writing data to a memory device (e.g., memory device 130-a, memory device 130-b) based on receiving the command. Determining whether to use the data migration technique for writing data to the memory device based on receiving the command may be based on one or more factors, conditions, determinations, other aspects, or any combination thereof.

At 210, a determination may be made whether to a production state awareness (PSA) operation is complete. For example, the memory system may determine whether the production operation, which may also be referred to a PSA operation, is complete based on receiving the command, based on one or more flags, based on an amount of space used in performing the PSA operation, or based on an amount of space available to be written in the memory device, or any combination thereof, among other factors. In such cases, determining whether to use the data migration technique may be based on determining whether the production operation is complete.

The production operation may be an example of an operation in which the host system may write to the memory device (e.g., memory device 130) one or more operating system (OS) parameters, among other aspects. For example, the host system may set a flag to indicate that the operation is the production operation, and the memory system may detect the production operation and/or determine a completion of production operation based on the set flag. After the production operation, a related reflow operation may occur, and the memory device may be refreshed (e.g., powered off/on). In some examples, the data written to the memory device for the production operation may be relatively smaller than data written to the memory device outside of the production operation (e.g., during data migration). In some cases, the production operation may include a high temperature profile. In such cases, the data may be routed to a SLC cache region before the production operation, and/or after the production operation is complete, the data may be rerouted back to the memory device.

If the production operation is determined to be incomplete or ongoing at 210, the process 200 may proceed to 230. For example, the memory system may determine that the production operation is incomplete. The memory system may prevent interrupting the production operation for performing data migration by proceeding to 230 rather than using the data migration technique. At 230, the memory system may write the data to the memory device using a second data migration technique based on determining that the production operation is incomplete. For example, the memory system may refrain from using the data migration technique (e.g., using a first write format such as TLC and then migrating the data to second write format such as QLC) for writing the data to the memory device based on determining that the production operation is incomplete. The second data migration technique may be, for example, an implementation of a cache algorithm.

In some cases, if the production operation is determined to be incomplete or ongoing at 210, the memory system may write the data to the memory device using a third data migration technique based on determining that the production operation is incomplete. The third data migration technique may include, for example, an implementation of an SLC mode using a trim setting. The SLC mode may be an example of using a SLC write format. In such examples, the SLC mode may be an example of programming a single memory cell—such as an SLC memory cell—to one of multiple supported states (e.g., two supported states) and storing one bit of information at a time (e.g., a logic 0 or a logic 1). In such cases, the memory system may refrain from using the data migration technique (e.g., using a first write format such as TLC and then migrating the data to second write format such as QLC) for writing the data to the memory device based on using the third data migration technique. The trim setting may, in some examples, be related to data retention during a reflow operation associated with the production operation and a high temperature profile.

If the production operation is determined to be incomplete or ongoing at 210, the memory system may write the data to the memory device using a fourth data migration technique based on determining that the production operation is incomplete. The fourth data migration technique may include, for example, an implementation of an SLC mode using a trim setting different than the trim setting associated with the third data migration technique. The trim setting may be related to high performance (e.g., an increase in the performance of the memory device). For example, the third data migration technique may improve the memory system performance on the initial data transfer as well as the overall efficiency of the memory system without allocating a large, dedicated cache to support data migration. The trim setting may be an example of a NAND trim setting if the memory device includes NAND. In using this trim setting as part of writing the data, the set margin (e.g., threshold) between different levels (e.g., different SLC levels) may be more relaxed to allow for increased speed and efficiency relative to other write operations, including those that may also be performed in writing the data without the trim setting.

If the production operation is determined to be complete at 210, the process 200 may proceed to 215. For example, the memory system may determine that the production operation is complete based on receiving the command, based on one or more flags, based on an amount of space used in performing the PSA operation, or based on an amount of space available to be written in the memory device, or any combination thereof, among other factors. The memory system may determine to use the data migration technique based, at least in part, on determining that the production operation is complete.

At 215, a determination may be made whether space is available to be written. For example, the memory system may determine whether an amount of space available (e.g., in a memory device) is equal to or greater than (e.g., exceeds) a threshold based on determining that the production operation is complete. In such cases, the memory system may in determining whether the amount of space available is equal to or greater than the threshold may check a logical availability of the memory system, including, but not limited to a memory device. In some case, determining whether to use the data migration technique is based on determining whether the amount of space available to be written is equal to or exceeds the threshold. In some cases, the amount of space available to be written may include a space available to write 64 gigabytes of data.

If the amount of space available to be written is less than the threshold, the process 200 may proceed to 230. For example, the memory system may determine that the amount of space available to be written (e.g., for the data to be transferred) is below the threshold. In some cases, the memory system may determine that there is no amount of space available to be written or very little amount of space available to be written (e.g., that the memory device is full or nearly full). At 230, the memory system may write the data to the memory device using the second data migration technique (as opposed to using the first data migration technique) based on determining that the amount of space available is below the threshold. For example, the memory system may refrain from using the first data migration technique (e.g., using a first write format such as TLC and then migrating the data to second write format such as QLC) for writing the data to the memory device based on determining that the amount of space available is below the threshold.

In some example, the threshold may be on the order of about 30-40% of unavailable space. For example, if the memory system determines that more than 30-40% of the memory device is full or in use (e.g., unavailable space) due to previously written information, then the memory system may write the data to the memory device using the second data migration technique (as opposed to using the first data migration technique). In such cases, the memory system may determine that the memory device includes less than 60-70% available space to be written.

In some cases, an amount of QLC space may be less than an amount of TLC space based on a conversion of QLC space to TLC space (e.g., because writing data in a QLC format may require relatively less space compared to writing date in a TLC format due to QLC formatting containing up to four bits per cell while TLC formatting containing up to three bits per cell). In such cases, the memory system may determine the amount of available space to be written in the memory device before writing the data using the data migration technique. For example, the memory system may determine that an amount of space available to be written on a second memory device (e.g., memory device 130-*b*) may be less than an amount of space available to be written on a first memory device (e.g., memory device 130-*a*). The memory system may refrain from writing the data to the second memory device using the data migration technique and instead write the data to the second memory device using the second data migration technique.

If the amount of space available to be written is equal to or above the threshold, the process 200 may proceed to 220. For example, the memory system may determine that the amount of space available to be written is equal to or above the threshold. In some examples, the memory system may determine that the memory device is empty or determine that a portion of the memory device (e.g., sufficient for writing the data) is empty. In such cases, the memory system may determine to use the data migration technique based on determining that the amount of space available is equal to or exceeds the threshold.

For example, if the memory system determines that less than 30-40% of the memory device is full or in use (e.g., unavailable space), then the memory system may write the data to the memory device using the data migration technique. In such cases, the memory system may determine that the memory device includes more than 60-70% available space to be written. In other examples, the memory system may determine that an amount of space available to be written on the second memory device is equal to the amount of space written on the first memory device. In such cases, the memory system may use the data migration technique to write data to the second memory device. In some cases, a full QLC cache may decrease the performance of the memory system due to the lack of available space, which may result in the memory device experiencing longer programming times and longer processing times. In such cases, the memory system may use the data migration technique to write data to the second memory device (as opposed to the full QLC cache), thereby improving the performance of the memory system.

At 220, a determination may be made whether the data is continuous. For example, the memory system may determine whether the data is continuous (e.g., whether the data is sequential). Continuous data may be an example of data located at equally spaced increments of time where each piece of data is received one after the other and in some cases at the equally spaced increments of time. Each piece of data may be associated with a time stamp such that a first piece of the continuous data may be received before a second piece of the continuous data, and the second piece of the continuous data may be received before a third piece of the continuous data. In some cases, the continuous data may be read one piece (e.g., subset) of data a time and each piece of data may be processed based on information collected from the previous pieces of data.

If the data is determined to be non-continuous at 220, the process 200 may proceed to 230. For example, the memory system may determine that the data is non-sequential data based on determining that the amount of space available to be written is equal to or above the threshold. In some examples, the memory system may determine that a size of the data is below a threshold based on determining that the amount of space available to be written is equal to or above the threshold. In such cases, the memory system may determine whether to use the data migration technique based on determining that the data is non-sequential data and determining that the size of the data is below the threshold. For example, the memory system may determine to use the second migration technique based on determining that the data is nonsequential and determining that the size is below the threshold.

At 230, the memory system may write the data to the memory device using the second data migration technique based on determining that the data is non-sequential data and determining that the size of the data is below the threshold. For example, the memory system may refrain from using the data migration technique for writing the data to the memory device based on determining that the data is non-sequential data and determining that the size of the data is below the threshold.

If the data is determined to be continuous at 220, the process 200 may proceed to 225. For example, the memory system may determine that the data is sequential data based on determining that the amount of space available to be written is equal to or above the threshold. In some examples, the memory system may determine that a size of the data exceeds the threshold based on determining that the amount of space available to be written is equal to or above the threshold. For example, the data may include a maximum size, such as 512 kilobytes, of data where the data may sequential. In such cases, the memory system may determine to use the data migration technique based on determining that the data is sequential data and determining that the size of the data exceeds the threshold.

At 225, as a result of one or more various determinations performed at 210, 215, 220, or any combination thereof, a determination may be made to use the first migration technique (e.g. data migration technique), which may include using a first write format such as TLC and then migrating the data to second write format such as QLC. For example, the memory system may determine to use the data migration technique based on determining that the PSA operation is complete, determining that space is available, and determining that the data is continuous. The various operations, determinations, comparisons, etc. described with reference to the process 200 may be performed by one or more components, for example, components of a memory system (e.g., memory system 110). In some examples, various components, processors, circuitry, elements, or modules (or any combination thereof) may be configured to perform these various operations. Among other examples, the various operations, determinations, comparisons, etc. described with reference to the process 200 may be performed by one or more of a memory system controller (e.g., memory system controller 115), local memory (e.g., local memory 120), or a memory device (e.g., memory device 130-*a* or 130-*b*), other options, or any combination thereof.

Figure 3:
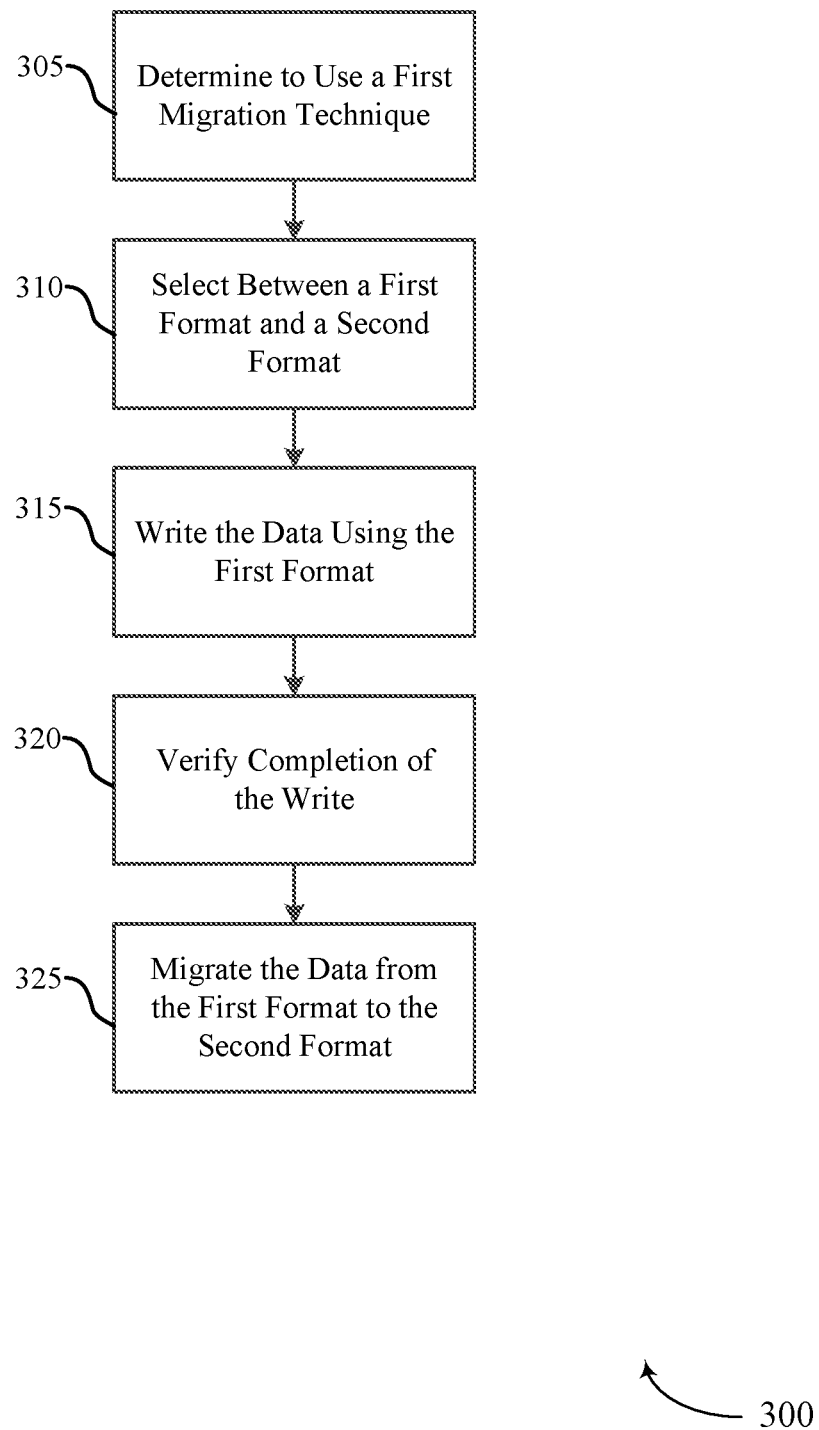
FIG. 3 illustrates a process that supports data migration techniques in accordance with examples as disclosed herein.

FIG. 3 illustrates a process 300 that supports data migration techniques in accordance with examples as disclosed herein. Aspects of the process 300 may be implemented by a controller, among other components. Additionally or alternatively, aspects of the process 300 may be implemented as instructions stored in memory (e.g., firmware stored in a memory coupled with the memory system 110). For example, the instructions, when executed by a controller (e.g., the memory system controller 115), may cause the controller to perform the operations of the process 300.

Process 300 may support implementing the data migration technique, as described in reference to the process 200 and FIG. 2. At 305, a determination may be made to use the first migration technique (e.g., the data migration technique). For example, the memory system (e.g., memory system 110) may determine to use the data migration technique for writing data to the memory device (e.g., memory device 130).

At 310, a selection between a first format (e.g., tri-level write format) and a second format (e.g., quad-level write format) may be completed. For example, the memory system may select between using the first format and the second format for writing the data to the memory device based on the determination to use the first migration technique and based on the memory system and/or some component thereof be configured to be able to write data in multiple formats (e.g., being able to write data in one of multiple formats based on one or more conditions, calculations, determinations, and/or measurements). In some cases, the memory system may determine to use the first format or the second format for writing the data based on one or more operations, such as those performed at 210, 215, and/or 220, among others. For example, the memory system may select the first format instead of the second format for writing the data. The memory device may be configured to write the data in the first format and the second format based on the write command received from the host system (e.g., host system 105).

At 315, data may be written using the first format. For example, the memory system may write the data to the memory device using the first format, which may be a TLC format, based on selecting the first format.

In some cases, the memory system may write the data to a main storage of the memory device. The main storage of the memory device may be an example of a TLC cache. The TLC cache may include an increased amount of storage space as compared to other caches. For example, the size of the TLC cache may be dynamic and adjusted based on a size of the incoming data, thereby allowing the data to be written in the first format to the TLC cache (as opposed to if the data were intended to be written to another storage location, such as another cache, that may not be large enough to accommodate such a write). In other systems, the size of the other caches may be static, thereby preventing an increased amount of incoming data to be written in the first format to the other caches.

In some examples, the memory system may use a trim setting, such as a NAND trim setting if the memory device include NAND, and a page map to write the data using the first format. The trim setting may in some cases be related to data retention and if a relatively faster TLC write process is implemented using a trim setting (e.g., the write process may be a special TLC write operation, such as one based on a trim setting, that may be relatively faster and more efficient than other TLC write operations), and the data will be migrated from one format (e.g., a TLC format) to a second format (e.g., a QLC format) relatively soon, then the data retention for such data written based on the trim setting using the first format (e.g., the TLC format) may be relaxed compared to other write processes, such as other write processes using the first format (e.g., the TLC format) and/or other examples. In some cases, the memory system may set a spacing between at least two memory states of the memory device relative to a threshold. In such cases, writing the data using the first format based on a trim setting may be based on determining that the spacing between the at least two memory states satisfies the threshold, which may be lower (e.g., the threshold between different states may be lower when writing using the trim setting and this enhanced technique than for alternative write operations using a same write format and/or a different write format). Said another way, in using this trim setting as part of writing the data in a first format, the set margin (e.g., threshold) between different levels (e.g., different TLC levels) may be more relaxed to allow for increase speed and efficiency relative to other write operations, including those that may also be performed in writing the data in the first format without the trim setting.

The memory device (e.g., memory device 130), which may be a NAND device, may receive a command that indicates that the data may be written using the first format (e.g., the command indicates a TLC write). In such cases, the memory device may be configured to set the cell level as the TLC, and the block of the memory device (e.g., blocks 170)

may be treated as TLC, for example, based on a command sequence. The TLC write may operate (relative to other techniques, such as a QLC write) at decreased processing and write times, thereby increasing the overall efficiency and operations of the memory system. Writing the data using to a memory device using the first format may be an example of an intermediate step to decrease the processing times and increase the efficiency of the memory system operations (relative to other techniques, such as writing the data to the memory device using another format, such as a QLC write format).

At 320, the completion of the write using the first format may be verified. For example, the memory system may verify a completion of the write using the first format, for example, based on determining a type of write format after the data is written to the memory device or based on receiving the command that indicates that the data is written using the first format, among other factors. In such case, the memory system may verify that writing in the first format is successful (e.g., complete).

At 325, after verifying the completion of the write using the first format, the data may be migrated (e.g., converted, rewritten) from the first format to the second format. For example, the memory system may migrate the data from the first format, which may be a TLC format, to the second format, which may be a QLC format. In such cases, the memory system may convert the data from the first format to the second format based on writing the data. The memory system may determine and/or select a time for the migration from the first format to the second format. For example, the memory system may identify an idle period based on (e.g., after) writing the data. The idle period may be an example of a background operation time or a time not otherwise specified to execute one or more other commands and/or operations. In such cases, after the data is written in the first format, the memory system may determine (e.g., by analyzing a time for performing other commands and/or other operations and selecting from one of plurality of idle times) an idle time to convert the data from the first format to the second format. During the idle time, the memory system may migrate the data in the first format (e.g., including TLC data such as data written in a TLC format) to the second format (e.g., including QLC data such as data written in a QLC format).

In some examples, the data may be transferred at increased speeds, such as, based on a cache policy, for example, one or more TLC cache policies. In such cases, the data migration technique may be enhanced based on the large data transfer being a one-time event (e.g., may be a special TLC write operation, such as one based on a trim, that may be relatively faster and more efficient than other TLC write operations). For example, data transfers subsequent to the large data transfer may include a size of data less than a size of the initial data transfer. A speed of the data transfer may be limited by reliability constraints such as a cross temperate and data retention rate. The TLC cache policy may use a memory device margin to increase the write time during the data migration technique (e.g., writing the data using the first format). In such cases, the data retention may be enhanced while maintaining the integrity of the data. The device margins may decrease (e.g., spacing between at least two memory states of the memory device), thereby increasing the performance times of the memory system, streamlining the data transfer, and increasing the efficiency of the data transfer.

Figure 4:
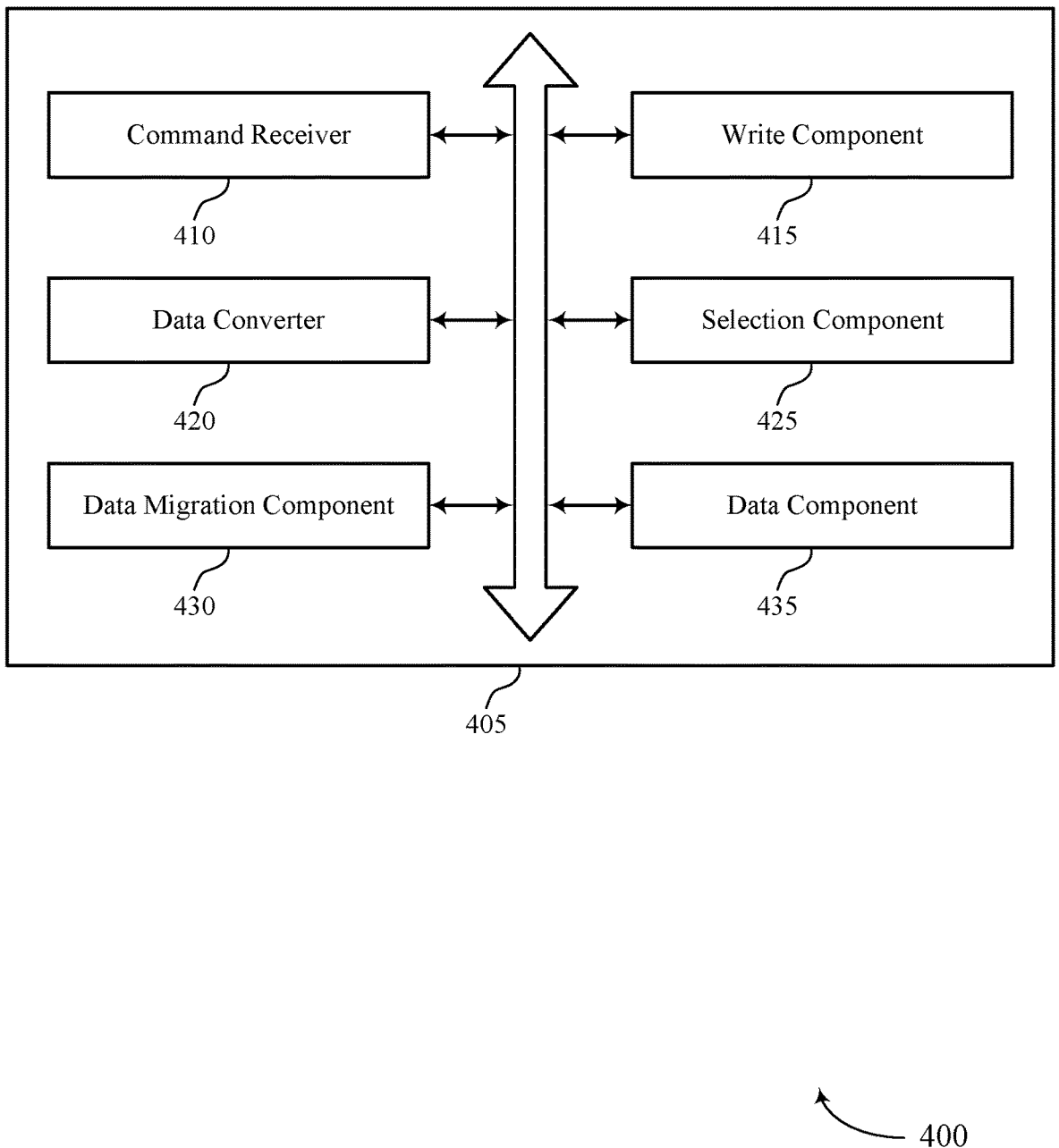
FIG. 4 shows a block diagram of a memory system that supports data migration techniques in accordance with examples as disclosed herein.

FIG. 4 shows a block diagram 400 of a memory system 405 that supports data migration techniques in accordance with examples as disclosed herein. The memory system 405 may be an example of aspects of a memory system as described with reference to FIGS. 1 through 3. The memory system 405 may include a command receiver 410, a write component 415, a data converter 420, a selection component 425, a data migration component 430, and a data component 435. Each of these components may communicate, directly or indirectly, with one another (e.g., via one or more buses).

The command receiver 410 may receive, from a host device, a command associated with a write operation. The command receiver 410 may be an example of a memory system controller, a processor, or any other component configured to receive a command such as a command associated with the write operation.

The write component 415 may write the data to the memory device using the tri-level write format based on selecting the tri-level write format. In some examples, the write component 415 may write the data to the memory device using a second data migration technique based on determining that the amount of space available is below the threshold. In some examples, the write component 415 may write the data to the memory device using a second data migration technique based on determining that the production operation is incomplete.

In some examples, the write component 415 may determine that a spacing between at least two memory states of the memory device is below a threshold, where writing the data is based on determining that the spacing between the at least two memory states is below the threshold.

The write component 415 may be an example of a central processing unit (CPU), a processor, or any other component configured to write data using a selected format and/or data migration technique such as a tri-level write format and/or the second data migration technique.

The data converter 420 may convert the data from the tri-level write format to the quad-level write format based on writing the data. In some examples, the data converter 420 may identify an idle period based on writing the data, where converting the data is performed during the idle period.

The data converter 420 may be an example of a CPU, a processor, or any other component configured to convert data from a first format to a second format such as migrating the data from the tri-level write format to the quad-level write format.

The selection component 425 may select a tri-level write format instead of a quad-level write format for writing the data based at least in part determining to use the data migration technique. In some examples, the selection component 425 may determine that the memory device can write the data in the tri-level write format and the quad-level write format, where selecting the tri-level write format instead of the quad-level write format is based on the determining.

A selection component 425 may be an example of a selector, a switch, a transistor, a processor, or any other component configured to select between two or more write formats and/or determine that the memory device can write the data in the tri-level write format and the quad-level write format.

The data migration component 430 may determine whether to use a data migration technique for writing data to the memory device based on receiving the command. In some examples, the data migration component 430 may determine whether an amount of space available to be written exceeds a threshold based on determining that a production operation is complete, where determining whether to use the data migration technique is based on determining whether the amount of space available to be written exceeds the threshold.

In some examples, the data migration component 430 may determine that the amount of space available to be written is below the threshold. In some examples, the data migration component 430 may determine that the amount of space available to be written is equal to or above the threshold, where determining to use the data migration technique is based on determining that the amount of space available is equal to or exceeds the threshold.

In some examples, the data migration component 430 may determine whether a production operation is complete based on receiving the command, where determining whether to use the data migration technique is based on determining whether the production operation is complete. In some examples, the data migration component 430 may determine that the production operation is incomplete. In some examples, the data migration component 430 may determine that the production operation is complete, where determining to use the data migration technique is based on determining that the production operation is complete.

The data migration component 430 may be an example of a comparator, a processor, or any other component configured to determine whether to use a data migration technique for writing data to the memory device such as determining whether a production operation is complete, determining whether space is available, and/or determining whether the data is continuous.

The data component 435 may determine that the data is sequential data based on determining that the amount of space available to be written is above the threshold. In some examples, the data component 435 may determine that a size of the data exceeds a threshold based on determining that the amount of space available to be written is above the threshold, where determining to use the data migration technique is based on determining that the data is sequential data and determining that the size of the data exceeds the threshold.

In some examples, the data component 435 may determine that the data is non-sequential data based on determining that the amount of space available to be written is above the threshold. In some examples, the data component 435 may determine that a size of the data is below a threshold based on determining that the amount of space available to be written is above the threshold, where determining whether to use the data migration technique is based on determining that the data is non-sequential data and determining that the size of the data is below the threshold.

The data component 435 may be an example of a comparator, a processor, or any other component configured to determine a type of data such as determining whether the data in sequential data or non-sequential data and/or determining a size of the data.

Figure 5:
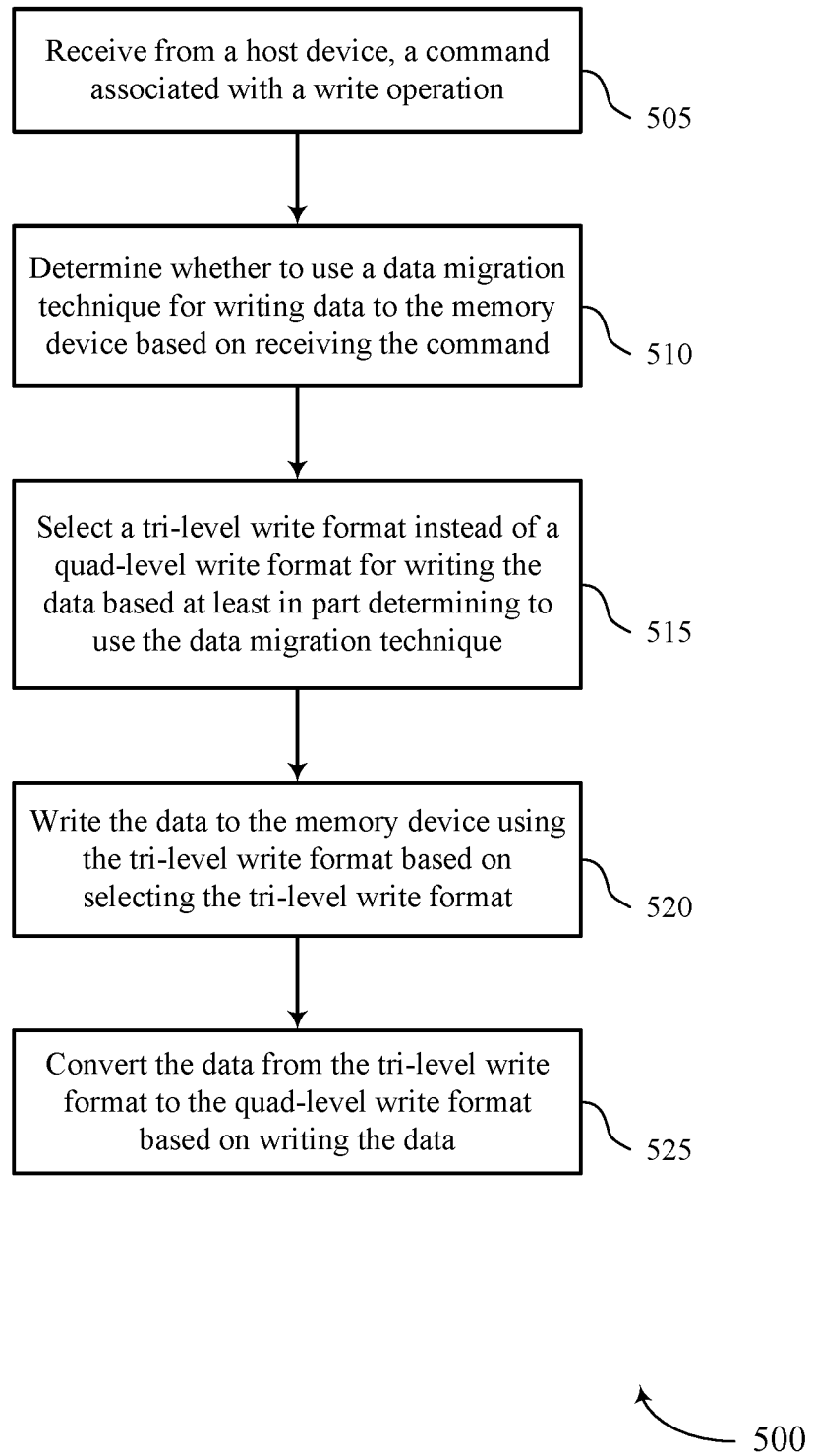
FIG. 5 shows a flowchart illustrating a method or methods that support data migration techniques in accordance with examples as disclosed herein.

FIG. 5 shows a flowchart illustrating a method or methods 500 that supports data migration techniques in accordance with examples as disclosed herein. The operations of method 500 may be implemented by a memory system or its components as described herein. For example, the operations of method 500 may be performed by a memory system as described with reference to FIG. 4. In some examples, a memory system may execute a set of instructions to control the functional elements of the memory system to perform the described functions. Additionally or alternatively, a memory system may perform aspects of the described functions using special-purpose hardware.

Aspects of the method 500 may be implemented by a controller, among other components. Additionally or alternatively, aspects of the method 500 may be implemented as instructions stored in memory (e.g., firmware stored in a memory coupled with the memory system 110). For example, the instructions, when executed by a controller (e.g., the memory system controller 115), may cause the controller to perform the operations of the method 500.

At 505, a command may be received. For example, the memory system may receive from a host device, a command associated with a write operation. The operations of 505 may be performed according to the methods described herein. In some examples, aspects of the operations of 505 may be performed by a command receiver as described with reference to FIG. 4.

At 510, a determination may be made whether to use a data migration technique. For example, the memory system may determine whether to use a data migration technique for writing data to the memory device based on receiving the command. The operations of 510 may be performed according to the methods described herein. In some examples, aspects of the operations of 510 may be performed by a data migration component as described with reference to FIG. 4.

At 515, a tri-level write format may be selected. For example, the memory system may select a tri-level write format instead of a quad-level write format for writing the data based at least in part determining to use the data migration technique. The operations of 515 may be performed according to the methods described herein. In some examples, aspects of the operations of 515 may be performed by a selection component as described with reference to FIG. 4.

At 520, the data may be written. For example, the memory system may write the data to the memory device using the tri-level write format based on selecting the tri-level write format. The operations of 520 may be performed according to the methods described herein. In some examples, aspects of the operations of 520 may be performed by a write component as described with reference to FIG. 4.

At 525, the data may be converted. For example, the memory system may convert the data from the tri-level write format to the quad-level write format based on writing the data. The operations of 525 may be performed according to the methods described herein. In some examples, aspects of the operations of 525 may be performed by a data converter as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving from a host device, a command associated with a write operation, determining whether to use a data migration technique for writing data to the memory device based on receiving the command, selecting a tri-level write format instead of a quad-level write format for writing the data based at least in part determining to use the data migration technique, writing the data to the memory device using the tri-level write format based on selecting the tri-level write format, and converting the data from the tri-level write format to the quad-level write format based on writing the data.

Some examples of the method 500 and the apparatus described herein may further include operations, features, means, or instructions for determining that the memory device can write the data in the tri-level write format and the quad-level write format, where selecting the tri-level write format instead of the quad-level write format may be based on the determining.

Some examples of the method 500 and the apparatus described herein may further include operations, features, means, or instructions for determining whether an amount of space available to be written exceeds a threshold based on determining that a production operation may be complete, where determining whether to use the data migration technique may be based on determining whether the amount of space available to be written exceeds the threshold.

In some examples of the method 500 and the apparatus described herein, determining whether the amount of space available exceeds the threshold further may include operations, features, means, or instructions for determining that the amount of space available to be written may be below the threshold, the method 500 and the apparatus described herein may further include operations, features, means, or instructions for writing the data to the memory device using a second data migration technique based on determining that the amount of space available is below the threshold.

In some examples of the method 500 and the apparatus described herein, determining whether the amount of space available exceeds the threshold further may include operations, features, means, or instructions for determining that the amount of space available to be written may be equal to or above the threshold, where determining to use the data migration technique may be based on determining that the amount of space available may be equal to or exceeds the threshold.

Some examples of the method 500 and the apparatus described herein may further include operations, features, means, or instructions for determining that the data may be sequential data based on determining that the amount of space available to be written may be above the threshold, and determining that a size of the data exceeds a threshold based on determining that the amount of space available to be written may be above the threshold, where determining to use the data migration technique may be based on determining that the data may be sequential data and determining that the size of the data exceeds the threshold.

Some examples of the method 500 and the apparatus described herein may further include operations, features, means, or instructions for determining that the data may be non-sequential data based on determining that the amount of space available to be written may be above the threshold, and determining that a size of the data may be below a threshold based on determining that the amount of space available to be written may be above the threshold, where determining whether to use the data migration technique may be based on determining that the data may be non-sequential data and determining that the size of the data may be below the threshold.

Some examples of the method 500 and the apparatus described herein may further include operations, features, means, or instructions for determining whether a production operation may be complete based on receiving the command, where determining whether to use the data migration technique may be based on determining whether the production operation may be complete.

In some examples of the method 500 and the apparatus described herein, determining whether the production operation may be complete further may include operations, features, means, or instructions for determining that the production operation may be incomplete, the method 500 and the apparatus described herein may further include operations, features, means, or instructions for writing the data to the memory device using a second data migration technique based on determining that the production operation is incomplete.

In some examples of the method 500 and the apparatus described herein, determining whether the production operation may be complete further may include operations, features, means, or instructions for determining that the production operation may be complete, where determining to use the data migration technique may be based on determining that the production operation may be complete.

Some examples of the method 500 and the apparatus described herein may further include operations, features, means, or instructions for identifying an idle period based on writing the data, where converting the data may be performed during the idle period.

Some examples of the method 500 and the apparatus described herein may further include operations, features, means, or instructions for determining that a spacing between at least two memory states of the memory device may be below a threshold, where writing the data may be based on determining that the spacing between the at least two memory states may be below the threshold.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a memory device, and a control circuit coupled with the memory device and configured to cause the apparatus to receive from a host device, a command associated with a write operation, determine whether to use a data migration technique for writing data to the memory device based on receiving the command, select a tri-level write format instead of a quad-level write format for writing the data based at least in part determining to use the data migration technique, write the data to the memory device using the tri-level write format based on selecting the tri-level write format, and convert the data from the tri-level write format to the quad-level write format based on writing the data.

Some examples may further include determining that the memory device can write the data in the tri-level write format and the quad-level write format, where selecting the tri-level write format instead of the quad-level write format may be based on the determining.

Some examples may further include determining whether an amount of space available to be written exceeds a threshold based on determining that a production operation may be complete, where determining whether to use the data migration technique may be based on determining whether the amount of space available to be written exceeds the threshold.

Some examples may further include determining that the amount of space available to be written may be below the threshold, the control circuit coupled with the memory device and configured to cause the apparatus to write the data to the memory device using a second data migration technique based on determining that the amount of space available is below the threshold.

Some examples may further include determining that the amount of space available to be written may be equal to or above the threshold, where determining to use the data migration technique may be based on determining that the amount of space available may be equal to or exceeds the threshold.

Some examples may further include determining that the data may be sequential data based on determining that the amount of space available to be written may be above the threshold, and determine that a size of the data exceeds a threshold based on determining that the amount of space available to be written may be above the threshold, where determining to use the data migration technique may be based on determining that the data may be sequential data and determining that the size of the data exceeds the threshold.

Some examples may further include determining that the data may be non-sequential data based on determining that the amount of space available to be written may be above the threshold, and determine that a size of the data may be below a threshold based on determining that the amount of space available to be written may be above the threshold, where determining whether to use the data migration technique may be based on determining that the data may be non-sequential data and determining that the size of the data may be below the threshold.

Some examples may further include determining whether a production operation may be complete based on receiving the command, where determining whether to use the data migration technique may be based on determining whether the production operation may be complete.

Some examples may further include determining that the production operation may be incomplete, the control circuit coupled with the memory device and configured to cause the apparatus to write the data to the memory device using a second data migration technique based at least in part on determining that the production operation is incomplete.

Some examples may further include determining that the production operation may be complete, where determining to use the data migration technique may be based on determining that the production operation may be complete.

Some examples may further include identifying an idle period based on writing the data, where converting the data may be performed during the idle period.

Some examples may further include determining that a spacing between at least two memory states of the memory device may be below a threshold, where writing the data may be based on determining that the spacing between the at least two memory states may be below the threshold.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus comprising:
   a first memory device; and
   control circuitry coupled with the first memory device and configured to cause the apparatus to:
   receive, from a host device, a command associated with a write operation;
   determine whether to use a data migration technique for transferring data from a second memory device to the first memory device in a tri-level write format or a quad-level write format based at least in part on receiving the command;
   select the tri-level write format instead of the quad-level write format for transferring the data from the second memory device to the first memory device based at least in part on a timing to complete transferring the data from the second memory device to the first memory device in the quad-level write format and determining to use the data migration technique;
   transfer the data from the second memory device to the first memory device in the tri-level write format based at least in part on selecting the tri-level write format;
   write the data to the first memory device using the tri-level write format based at least in part on selecting the tri-level write format; and
   convert the data from the tri-level write format to the quad-level write format based at least in part on writing the data.

2. The apparatus of claim 1, wherein the control circuitry is further configured to cause the apparatus to:
   determine that the first memory device can write the data in the tri-level write format and the quad-level write format, wherein selecting the tri-level write format instead of the quad-level write format is based at least in part on the determining that the first memory device can write the data in the tri-level write format and the quad-level write format.

3. The apparatus of claim 1, wherein the control circuitry is further configured to cause the apparatus to:
   determine whether an amount of space available to be written exceeds a threshold based at least in part on determining that a production operation is complete, wherein determining whether to use the data migration technique is based at least in part on determining whether the amount of space available to be written exceeds the threshold.

4. The apparatus of claim 3, wherein, to determine whether the amount of space available exceeds the threshold, the control circuitry is configured to cause the apparatus to:
   determine that the amount of space available to be written is below the threshold, wherein the control circuitry is further configured to cause the apparatus to:
   write the data to the first memory device using a second data migration technique based at least in part on determining that the amount of space available is below the threshold.

5. The apparatus of claim 3, wherein, to determine whether the amount of space available exceeds the threshold, the control circuitry is configured to cause the apparatus to:
  determine that the amount of space available to be written is equal to or above the threshold, wherein determining to use the data migration technique is based at least in part on determining that the amount of space available is equal to or exceeds the threshold.

6. The apparatus of claim 5, wherein the control circuitry is further configured to cause the apparatus to:
  determine that the data is sequential data based at least in part on determining that the amount of space available to be written is above the threshold; and
  determine that a size of the data exceeds a threshold based at least in part on determining that the amount of space available to be written is above the threshold, wherein determining to use the data migration technique is based at least in part on determining that the data is sequential data and determining that the size of the data exceeds the threshold.

7. The apparatus of claim 5, wherein the control circuitry is further configured to cause the apparatus to:
  determine that the data is non-sequential data based at least in part on determining that the amount of space available to be written is above the threshold; and
  determine that a size of the data is below a threshold based at least in part on determining that the amount of space available to be written is above the threshold, wherein determining whether to use the data migration technique is based at least in part on determining that the data is non-sequential data and determining that the size of the data is below the threshold.

8. The apparatus of claim 1, wherein the control circuitry is further configured to cause the apparatus to:
  determine whether a production operation is complete based at least in part on receiving the command, wherein determining whether to use the data migration technique is based at least in part on determining whether the production operation is complete.

9. The apparatus of claim 8, wherein, to determine whether the production operation is complete, the control circuitry is configured to cause the apparatus to:
  determine that the production operation is incomplete, wherein the control circuitry is further configured to cause the apparatus to:
  write the data to the first memory device using a second data migration technique based at least in part on determining that the production operation is incomplete.

10. The apparatus of claim 8, wherein, to determine whether the production operation is complete, the control circuitry is configured to cause the apparatus to:
  determine that the production operation is complete, wherein determining to use the data migration technique is based at least in part on determining that the production operation is complete.

11. The apparatus of claim 1, wherein the control circuitry is further configured to cause the apparatus to:
  identify an idle period based at least in part on writing the data, wherein converting the data is performed during the idle period.

12. The apparatus of claim 1, wherein the control circuitry is further configured to cause the apparatus to:
  determine that a spacing between at least two memory states of the first memory device is below a threshold, wherein writing the data is based at least in part on determining that the spacing between the at least two memory states is below the threshold.

13. A non-transitory computer-readable medium storing code comprising instructions, which when executed by one or more processing devices of an electronic device, cause the electronic device to:
  receive, from a host device, a command associated with a write operation;
  determine whether to use a data migration technique for transferring data from a first memory device to a second memory device in a tri-level write format or a quad-level write format based at least in part on receiving the command;
  select the tri-level write format instead of the quad-level write format for transferring the data from the first memory device to the second memory device based at least in part on a timing to complete transferring the data from the first memory device to the second memory device in the quad-level write format and determining to use the data migration technique;
  transfer the data from the first memory device to the second memory device in the tri-level write format based at least in part on selecting the tri-level write format;
  write the data to the second memory device using the tri-level write format based at least in part on selecting the tri-level write format and transferring the data from the first memory device to the second memory device; and
  convert the data from the tri-level write format to the quad-level write format based at least in part on writing the data.

14. The non-transitory computer-readable medium of claim 13, wherein the instructions, when executed by the one or more processing devices of the electronic device, further cause the electronic device to:
  determine that the second memory device can write the data in the tri-level write format and the quad-level write format, wherein selecting the tri-level write format instead of the quad-level write format is based at least in part on the determining that the first memory device can write the data in the tri-level write format and the quad-level write format.

15. The non-transitory computer-readable medium of claim 13, wherein the instructions, when executed by the one or more processing devices of the electronic device, further cause the electronic device to:
  determine whether an amount of space available to be written exceeds a threshold based at least in part on determining that a production operation is complete, wherein determining whether to use the data migration technique is based at least in part on determining whether the amount of space available to be written exceeds the threshold.

16. The non-transitory computer-readable medium of claim 15, wherein the instructions that, when executed by the one or more processing devices of the electronic device, cause the electronic device to determine whether the amount of space available exceeds the threshold comprise instructions that, when executed by the one or more processing devices of the electronic device, cause the electronic device to:
  determine that the amount of space available to be written is below the threshold, wherein the instructions, when executed by the one or more processing devices of the electronic device, further cause the electronic device to:

write the data to the second memory device using a second data migration technique based at least in part on determining that the amount of space available is below the threshold.

17. The non-transitory computer-readable medium of claim 15, wherein the instructions, when executed by the one or more processing devices of the electronic device, further cause the electronic device to:
determine that the amount of space available to be written is equal to or above the threshold, wherein determining to use the data migration technique is based at least in part on determining that the amount of space available is equal to or exceeds the threshold.

18. The non-transitory computer-readable medium of claim 17, wherein the instructions, when executed by the one or more processing devices of the electronic device, further cause the electronic device to:
determine that the data is sequential data based at least in part on determining that the amount of space available to be written is above the threshold; and
determine that a size of the data exceeds a threshold based at least in part on determining that the amount of space available to be written is above the threshold, wherein determining to use the data migration technique is based at least in part on determining that the data is sequential data and determining that the size of the data exceeds the threshold.

19. The non-transitory computer-readable medium of claim 17, wherein the instructions, when executed by the one or more processing devices of the electronic device, further cause the electronic device to:
determine that the data is non-sequential data based at least in part on determining that the amount of space available to be written is above the threshold; and
determine that a size of the data is below a threshold based at least in part on determining that the amount of space available to be written is above the threshold, wherein determining whether to use the data migration technique is based at least in part on determining that the data is non-sequential data and determining that the size of the data is below the threshold.

20. A method, comprising:
receiving, from a host device, a command associated with a write operation;
determining whether to use a data migration technique for transferring data from a first memory device to a second memory device in a tri-level write format or a quad-level write format based at least in part on receiving the command;
selecting the tri-level write format instead of the quad-level write format for transferring the data from the first memory device to the second memory device based at least in part on a timing to complete transferring the data from the first memory device to the second memory device in the quad-level write format and determining to use the data migration technique;
transfer the data from the first memory device to the second memory device in the tri-level write format based at least in part on selecting the tri-level write format;
writing the data to the second memory device using the tri-level write format based at least in part on selecting the tri-level write format and transferring the data from the first memory device to the second memory device; and
converting the data from the tri-level write format to the quad-level write format based at least in part on writing the data.

21. The method of claim 20, further comprising:
determining that the second memory device can write the data in the tri-level write format and the quad-level write format, wherein selecting the tri-level write format instead of the quad-level write format is based at least in part on the determining that the first memory device can write the data in the tri-level write format and the quad-level write format.

22. The method of claim 20, further comprising:
determining whether an amount of space available to be written exceeds a threshold based at least in part on determining that a production operation is complete, wherein determining whether to use the data migration technique is based at least in part on determining whether the amount of space available to be written exceeds the threshold.

23. The method of claim 22, wherein determining whether the amount of space available exceeds the threshold further comprises:
determining that the amount of space available to be written is below the threshold, the method further comprising; and
writing the data to the second memory device using a second data migration technique based at least in part on determining that the amount of space available is below the threshold.

24. The method of claim 22, wherein determining whether the amount of space available exceeds the threshold further comprises:
determining that the amount of space available to be written is equal to or above the threshold, wherein determining to use the data migration technique is based at least in part on determining that the amount of space available is equal to or exceeds the threshold.

25. The method of claim 24, further comprising:
determining that the data is sequential data based at least in part on determining that the amount of space available to be written is above the threshold; and
determining that a size of the data exceeds a threshold based at least in part on determining that the amount of space available to be written is above the threshold, wherein determining to use the data migration technique is based at least in part on determining that the data is sequential data and determining that the size of the data exceeds the threshold.

* * * * *